US012759662B2

(12) United States Patent
Reed et al.

(10) Patent No.: US 12,759,662 B2
(45) Date of Patent: Oct. 13, 2026

(54) SYSTEM FOR DETERMINING A PERSONALIZED DYNAMIC RESISTANCE MODEL

(71) Applicant: Cycling 360, LLC, Lakewood, CO (US)

(72) Inventors: John Reed, Lakewood, CO (US); Gregory Anderson, Bel Air, MD (US)

(73) Assignee: Cycling 360, LLC, Lakewood, CA (US)

( * ) Notice: Subject to any disclaimer, the term of this patent is extended or adjusted under 35 U.S.C. 154(b) by 228 days.

(21) Appl. No.: 18/468,335

(22) Filed: Sep. 15, 2023

(65) Prior Publication Data

US 2024/0092447 A1 Mar. 21, 2024

Related U.S. Application Data

(60) Provisional application No. 63/504,608, filed on May 26, 2023, provisional application No. 63/376,037, filed on Sep. 16, 2022.

(51) Int. Cl.
*B62J 45/40* (2020.01)
*G06N 5/022* (2023.01)

(52) U.S. Cl.
CPC .............. *B62J 45/40* (2020.02); *G06N 5/022* (2013.01)

(58) Field of Classification Search
None
See application file for complete search history.

(56) References Cited

U.S. PATENT DOCUMENTS

| | | | |
|---|---|---|---|
| 7,862,476 | B2 | 1/2011 | Blau et al. |
| 9,415,267 | B2 | 8/2016 | Ellis |
| 10,024,675 | B2 | 7/2018 | Schlesinger et al. |
| 2007/0042868 | A1 | 2/2007 | Fisher et al. |

(Continued)

FOREIGN PATENT DOCUMENTS

| | | | |
|---|---|---|---|
| WO | 2016168117 | A2 | 10/2016 |
| WO | 2016209430 | A1 | 12/2016 |

OTHER PUBLICATIONS

International Search Report and Written Opinion for International Application No. PCT/US2023/074360, mailed on Feb. 28, 2024, 18 pages.

(Continued)

*Primary Examiner* — Vicky A Johnson
(74) *Attorney, Agent, or Firm* — Brake Hughes Bellermann LLP

(57) ABSTRACT

Systems, methods, and devices for determining a cycling simulation of a trail ride. In one embodiment, a method includes receiving ride data collected by a plurality of sensors during a ride on a trail. The ride data is segmented into a plurality of time segments. The plurality of sensors are mounted to a bicycle or a rider of the bicycle. The method further includes determining a resistance model for the rider and the ride by determining a resistance variable for each time segment based on the received ride data and determining a power variable necessary to overcome each of the resistance variable at each respective time segment based on a plurality of user specific variables. The method further includes determining a cycling simulation of the ride based on the resistance model and providing the cycling simulation of the ride to a smart trainer device.

20 Claims, 5 Drawing Sheets

(56) References Cited

U.S. PATENT DOCUMENTS

| | | | | |
|---|---|---|---|---|
| 2017/0225742 | A1 | 8/2017 | Hancock et al. | |
| 2017/0368442 | A1 | 12/2017 | Baudhuin | |
| 2020/0254308 | A1 * | 8/2020 | Walthert | B62J 45/40 |
| 2020/0377176 | A1 * | 12/2020 | Shirai | B62J 1/08 |
| 2021/0269111 | A1 | 9/2021 | Kotlar | |

OTHER PUBLICATIONS

Extended European Search Report for European Application No. 23866549.1, dated Jun. 15, 2026, 11 pages.

* cited by examiner

SYSTEM FOR DETERMINING A PERSONALIZED DYNAMIC RESISTANCE MODEL

RELATED APPLICATIONS

This application claims priority to U.S. Provisional Application No. 63/376,037, filed Sep. 16, 2022, and to U.S. Provisional Application No. 63/504,608, filed May 26, 2023, the entire contents of which are incorporated by reference herein.

SUMMARY OF THE DESCRIPTION

Cycling is about moving mass through/over obstacles/resistance and the way we measure it is with how much power (watts) does the rider create to overcome those obstacles/resistance to move the mass.

The described system collects and determines data from real-world obstacles along a path based on the objects watts difficulty. For example, road cycling obstacles/resistance are approximately eighty percent wind and twenty percent ground whereas mountain biking is approximately twenty percent wind and eighty percent ground. In some embodiments, the described system employs known or estimated variables regarding the rider, the rider's equipment, the environment, and the terrain, to determine the amount of watts/power necessary to overcome these variables during a real-world ride at a given speed to generate a cycling simulation of the real-world ride.

Accordingly, in one aspect, disclosed herein, are methods for determining a cycling simulation of a trail ride. These methods comprise receiving ride data collected by a plurality of sensors during a trail ride, wherein the ride data is segmented into a plurality of time segments, and wherein the sensors are mounted to a bicycle or a rider of the bicycle; determining a resistance model for the rider and the trail by: determining a resistance variable for each time segment based on the received ride data, and determining a power variable necessary to overcome each of the resistance variable at each respective time segment based on a plurality of user specific variables; determining a cycling simulation of the trail ride based on the resistance model; and providing the cycling simulation of the trail ride to a smart trainer device.

In another aspect, disclosed herein, are methods for determining a recommended cycling event. These methods comprise receiving ride data associated with a rider of a bicycle and collected by a plurality of sensors during a ride on a trail; determining a recommended cycling event for the rider by processing the ride data through an artificial intelligence (AI) model trained with previously received ride data collected during a plurality of rides on a plurality of trails; and providing the recommended cycling event to a user device associated with the rider.

In yet another aspect, disclosed herein, are methods for determining a set of riders for a cycling event. These method comprise receiving event data associated with a cycling event; determining a set of riders for the cycling event by processing the event data through an AI model trained with a plurality of performance histories, wherein each of the performance histories is associated with one of a plurality of riders, wherein the set of riders is included in the plurality of riders; and providing the set of riders to a user device.

In yet another aspect, disclosed herein, are methods for determining a safety notification to a rider of a bicycle on a trail. These methods comprise receiving ride data associated with a rider of a bicycle and collected by a plurality of sensors during a ride on a trail; determining a safety notification by processing the ride data and a performance history associated with the rider through an AI model trained with previously received ride data collected during a plurality of rides on the trail; and providing the safety notification to a user device associated with the rider.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention and explain various principles and advantages of those examples.

Figure 1:
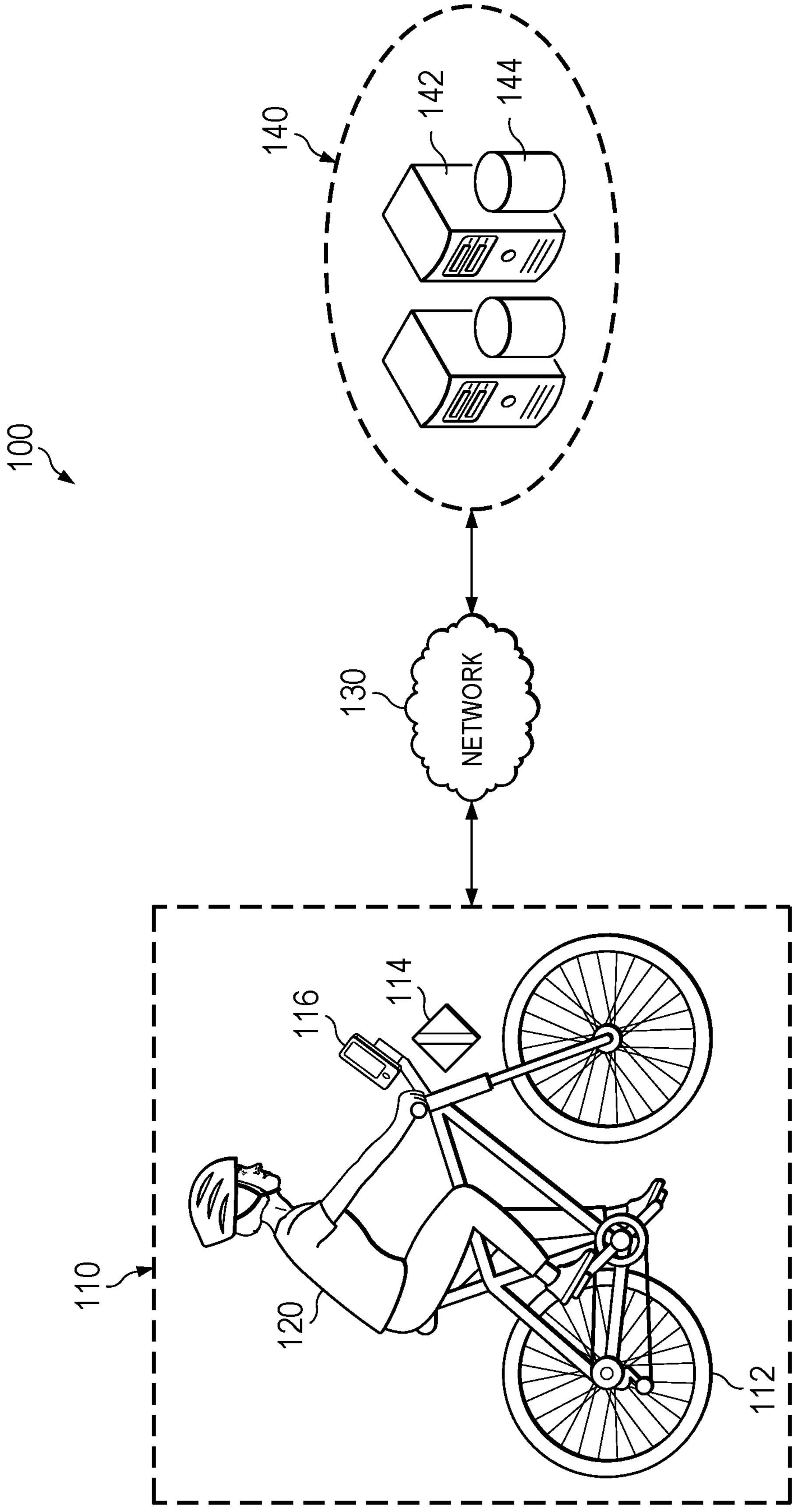
FIG. 1 depicts an example environment according to some aspects of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples and aspects described and illustrated.

The apparatus and method components have been represented where appropriate by conventional symbols in the drawings, showing only those specific details that are pertinent to understanding the examples and aspects disclosed so as not to obscure the disclosure with details that will be readily apparent to those of ordinary skill in the art having the benefit of the description herein.

DETAILED DESCRIPTION

Disclosed herein a systems and methods for determining relevant information based on ride data associated with a rider of a bicycle and collected by a plurality of sensors during a ride on a trail.

Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images.

As used herein, the term "rider obstacles" includes, for example, the weight of a rider, the size of the rider (e.g., height and width), and riding position (e.g., upright or tucked). These variables impact rider drag. For example, the size of a rider's frontal area being pushed through the atmosphere can be directly correlated to the watts/power needed to move the rider's mass.

As used herein, the term "equipment obstacles" includes, for example, the weight of the bicycle, the tire type(s), PSI of the tires, and bike gears. Generally, the weight of the bicycle increases the overall mass whereas the type of tires and their PSI contributes significantly to rolling resistance. Bikes gears generally impact the correlation between speed and power/watts while incurring a minor amount of drive-train loss of power/watts.

As used herein, the term "environmental obstacles" includes, for example, air density, wind, temperature, humidity, and altitude. Environmental obstacles generally impact the number of watts a rider must produce to move through the atmosphere at their desired rate. As an example, the air above ten thousand feet is thinner than the air at sea level and thus provides less resistance; however, it generally takes more effort for a rider to produce the same amount of power/watts at ten thousand feet because he or she is receiving less oxygen in each breath as compared a breath of air at sea level.

As used herein, the term "terrain obstacles" includes, for example, the pitch or grade of the road; the type of riding surface (e.g., dirt, sand, gravel, road, wood); pavement gaps; tree roots; rocks; boulders (e.g., baseball size to exercise ball size). Also, each terrain obstacle provides resistance that is unique to the obstacles real-world location.

As used herein, the term "resistance model" includes, for example, a representation of how much energy (watts) is required to move a mass (bicycle rider) overcoming atmosphere and environmental resistance for rider-determined speed.

As used herein, the term "smart trainer device" includes a device capable of simulating the realistic challenges of a ride. Generally, a smart trainer device is capable of processing complex equations that are both interdependent and variable based on user input to simulate a realistic "smart" real-world simulated rider experience. By incorporating elements of a ride, such as temperature, dew point, altitude, barometric pressure, terrain, as well as equipment specific (e.g., bike, tires, tire psi, and the like) as well as rider specific (e.g., height, weight, frontal displacement and the like) and calculating each variables impact on, for example, time, speed, and distance, for a predetermined course and pairing it with video that is synced to each calculation in real time that simulates the challenges of moving the rider through space with a resistance model that is paired visually with the same space. In some cases, such a device is capable of simulating variables that impact a rider, either independently or together. For example, a smart trainer device can simulate atmospheric conditions (e.g., dynamic variability and the impact of a clear summer day or a windy cold fall morning to the ride simulation provided by the resistance model). As another example, a smart trainer device can simulate terrain based on terrain data (e.g., how different types of terrain impacts a resistance model). As another example, a smart trainer device incorporates aspects of the rider (e.g., the rider's riding style and their physical presence on their bike) into a resistance model. In some cases, a "smart trainer device" is capable of differentiating each of these above examples to simulate a ride as well as combine these examples for a more complex and realistic "smart" real-world simulated experience.

As used herein, the term "cycling simulation" includes, for example, using the determined real world ride data to recreate the ride as a digital presentation as mathematically similar as the real ride for the user to experience elsewhere.

As used herein, the term "ride data" includes captured data points such as, but not limited to, dynamic terrain data, atmosphere, and environmental. Additionally, includes ride capture data, such as the watts used to capture the data, and other equipment details, such as rider weight, type of tire, tire PSI, geometry of the bike, suspension settings, and the like.

As used herein, the term "rider data" includes weight, equipment, type of equipment, equipment settings (e.g., road bike, mountain bike, suspension settings, type of tires, tire PSI, and the like) gender, location, age, height, and the like.

As used herein, the term "performance history" includes a rider's cycling history such as type of cyclist, how often, how difficult (time, speed, distance), how dynamic (type of terrain), location (sea level or high altitude), atmosphere and environmental data points, event history (types of events such as relaxed ride for a cause or professional race events, solo or group events), and the like.

As used herein, the term "event outing" includes a solo event or a group event that is sponsored or non-sponsored.

As used herein, the term "fondo" includes a relaxed group ride where everyone just enjoys riding together.

System Overview

In some embodiments, the described system determines resistance variables based on, for example, user entered data or general defaults (if not known). The system uses the resistance variables to determine the power/watts necessary to travel a given speed. In some embodiments, the system employs dual cameras to record the real-world rides (e.g., bike route) and visually pinpoint the obstacles and pairing this with multiple (e.g., 2 to 4) GPS location devices to record the position data. In some embodiments, up to five timestamps are stored as metadata with the recorded position data and employed when the recorded data is synced and provide extremely accurate position details. In some embodiments, the bicycle includes sensors measuring the physical impact on the bike suspension so that, when paired with the above data, detailed location data and size data for each physical obstacle along the bike route.

In some embodiments, the system calculates the amount of power/watts that a rider must produce for a given speed, which is calibrated to match the actual ride based the data collected during the recorded ride and user inputs (e.g., rider data, equipment data, environmental data, terrain obstacle data). In some embodiments, the system pairs a power meter to the geolocation data and the physical impact recorded from the bike suspension (e.g., spring rate, damping rate, travel velocity, force displacement) to determine the power/watts needed to overcome the physical obstacle at that location.

In some embodiments, the system processes a resistance model associated with a trail ride or a rider via an AI model to recommend a cycling event where the rider would, for example, perform well and have a positive cycling event experience. In some embodiments, the system processes the rider's simulator performance to suggest events. In some embodiments, the system processes a resistance model or a rider's performance history through a trained AI model to predict event performance as well as provide event recommendations. In some embodiments, the AI model is trained to consider common characteristics between riders such as, for example, age, weight, type of bike, geolocation, altitude, type of rides, average number of rides (e.g., weekend warrior or weekly rider) and the like.

For example, if a rider posts a good time on a twenty-five-mile ride and the resistance model determined for the rider (based on the collected sensor data) show suspension compressions exceeding fifty percent forty percent of the time the AI model is trained to recommend events within the scope of the rider's skill set based on the rider's fast and capable riding on a rough trail. As another example, the AI model may be trained to consider the type of ride history for a rider (e.g., whether the rider rides a road bike more often than an off-road bike). As another example, the AI model may be trained to consider a rider's environmental and equipment ride history data (e.g., the types of rides typically undertaken in the past X number of days (90, 180, 360 days), the types of equipment to which the rider has access or typically prefers to use (road bike, mountain bike, or both), the types of events the user typically enjoys or has proven to safely navigate, and the like).

In some embodiments, the AI model is trained to recommend global events. In some embodiments, when a rider's performance history indicates that the rider is a gravity rider (e.g., steep rides and big jumps at Ski Resorts in the summer where the gondola drops them off at the top) the AI model is trained to recommend other ski resorts that the rider might like to visit. For example, if "Randy" in Indiana is an avid rider in Indiana, the system may recommend global ride destinations and specific trails that he would enjoy at those destinations based on similar terrain, distance, altitude, weather, and the like.

In some embodiments, the determined event profile includes a ride difficulty level (e.g., ranging from Level 1-10) and sections of the ride that may be more difficult than the overall ride level. For example, when the AI model has determined that a rider has shown the ability to ride a particular trail (e.g., a ten-mile ride, with 3,000 feet of climbing, classified as a Level 6, with two quarter mile sections classified as Level 9, with the entire trail above 8,000 ft), the system provides the trail/ride recommendation along with a safety recommendation. As another example, when a rider has no cycling history, but a not-for-profit ride for a cure is a three-mile ride, with fifteen feet of climbing, the entire ride at sea level, and classified as a Level 1, the AI model, in some embodiments, would suggest that is an event the user could do safely and would probably enjoy.

In some embodiments, when a rider has a performance history (e.g., for road biking that is very competitive) aligns with the environmental data and an event's level classification, the AI model would recommend the event as the rider would enjoy the event and successfully navigate the expected norms of such events in a safe way for both them and other cyclists. As another example, if a rider on the east coast of the United States has shown a history of riding up hill on their road bike, in some embodiments, the AI model is trained to advise the use of caution if the rider selects an event in Colorado (e.g., Pikes Peak) because the performance history determined for the rider would not show a history of safely descending down steep mountain roads in the Rocky Mountains.

As another example, if a user in Florida is an avid road cyclists with a history of fifty-mile rides at or near sea level, in some embodiments, the AI model is trained to advise to use caution if the rider selects an event/ride where the altitude change is significantly different as it could cause some safety concerns while cycling. As another example, if a rider user thinking about an event/ride classified as a Level 5 and the rider has a long history of Level 5 riding but this event has a quarter mile section that is Level 7 and the rest of the ride is a Level 3, in some embodiments, the AI model is trained to provide information regarding the sections of the ride/event where the rider user should use caution based on our GPS and dynamic mapping of the ride/event course to ensure a safe and fun ride/event experience.

In some embodiments, the system employs an AI model to provide coaching to a rider. For example, after a ride, the system may provide, via a user device, an indication of how much closer the rider is to a particular goal or a comparison to other performances at an event (e.g., the rider would be in the upper 50% of all finishers or would complete the event in X number of hours).

In some embodiments, the system processes a resistance model(s) for a particular ride(s) or a performance history for a rider to determine the force and wear that the rider is putting on their gear to measure the expected useful life of the gear. For example, the system recommends service or to replace a part based on the dynamic resistance model instead of a generic number of hours of use.

In some embodiments, the system processes ride data, or a resistance model through a trained AI model to determine notifications to provide the rider (e.g., via a user device) in real time. In some embodiments, the system employs the AI model to track a ride in real-time and provide information regarding areas to use caution before the rider encounters these areas. In some embodiments, the AI model is trained to determine the notifications based on the performance history of the rider (e.g., considering the rider's skill level). For example, the notification may include information regarding the roughness of an upcoming section of the course/tail as well as the location of this roughness. In some embodiments, based on the performance history of the rider, the system may be employed to determine an event profile for the rider and a recommended event. Such a profile may include, for example, the type of ride (e.g., road, mountain, gravity, gravel), the type of event (e.g., family event, fondo (group ride), somewhat competitive, very competitive, pro-tour competitive), weather/atmospheric conditions (e.g., air density, air pressure, air temperature altitude), elevation grade, dynamic data, geolocation data, and the like.

In some embodiments, entities, such as an event organized, may provide event information, which is processed through a trained AI model to determine a group of riders who show they have the performance history to enjoy the event. In some embodiments, after an event season, the trained AI model processes the event data to identify areas of improving the events, both in safety based on the types of users who participated as well as how to safely grow the event by identifying gaps in the event offerings. For example, if an event was created as a group ride but has become competitive, the AI model can be trained to provide suggested changes to the event to create a family friendly course for less competitive cyclists to still enjoy the event. Alternatively, if a host wants a more competitive event, the AI model can be trained to suggest some changes in the course, rider support, marketing, and the like to draw more competitive users to the event.

Example Environment

FIG. 1 depicts an example environment 100 that can be employed to execute embodiments of the present disclosure. The example environment 100 includes data collection unit 110, a rider 120, and a back-end system 140, and a network 130. The data collection unit 110 includes a bicycle (or other type vehicle capable of having a rider) 112, various sensors and data collection devices 114, and a computing device 116. The sensors and data collection devices 114 are described in more detail below and include, for example, a bike suspension sensor, an accelerometer, geolocation device (e.g., Global Positioning System (GPS) device), thermometer, barometer, and at least one camera.

In some embodiments, the network 130 includes a local area network (LAN), wide area network (WAN), the Internet, or a combination thereof, and connects devices (e.g., the computing device 116). In some embodiments, the network 130 includes an intranet, an extranet, or an intranet or extranet that is in communication with the Internet. In some embodiments, the network 130 includes a telecommunication or a data network. In some embodiments, the network 130 can be accessed over a wired or a wireless communications link. For example, the computing device 116 (e.g., a smartphone device or a tablet device) can use a cellular network to access the network 130.

Figure 4:
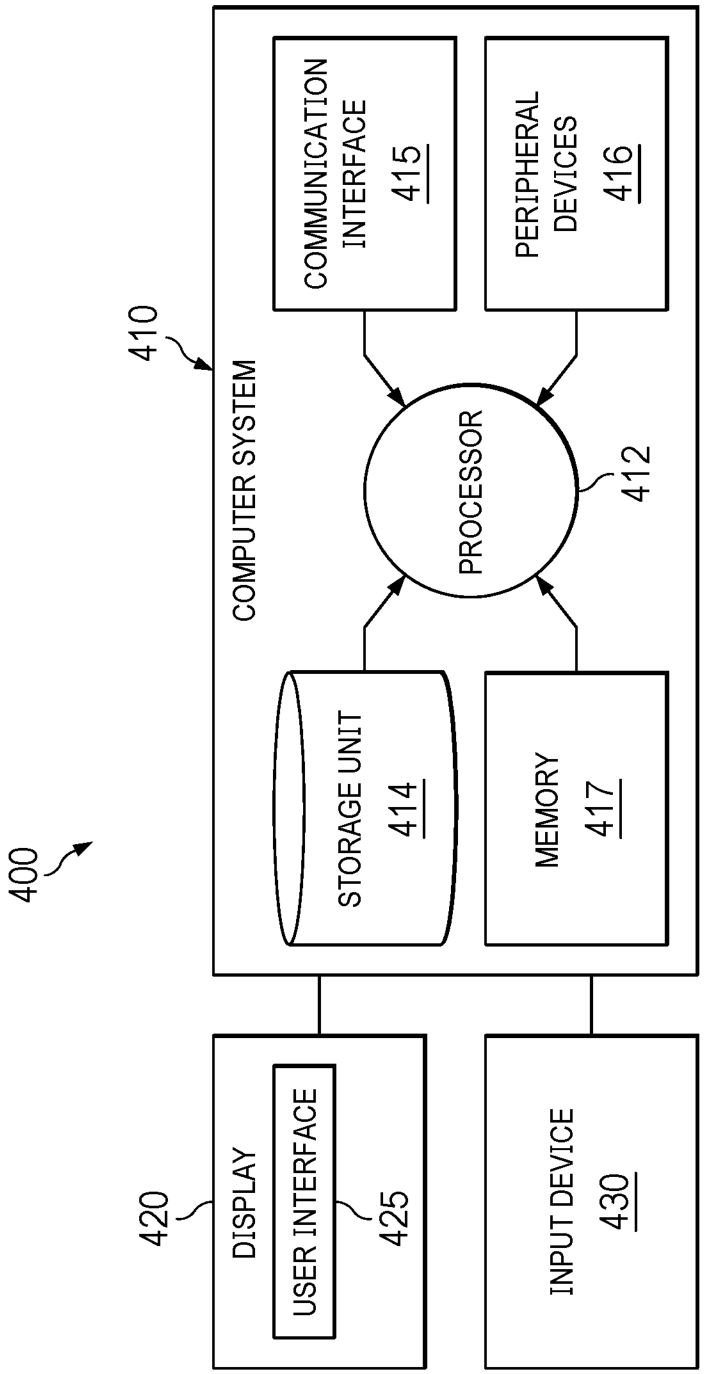
FIG. 4 is a block diagram of an example system that includes a computing device that can be programmed or otherwise configured according to some aspects.

In some embodiments, the computing device 116 is sustainably similar to computing device 410 depicted in FIG. 4. A single mobile computing device is depicted in FIG. 1 for simplicity. It is contemplated, however, that implementations of the present disclosure can be realized with any of the appropriate computing devices. The computing device 116 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data computing devices.

In the depicted example environment 100, the back-end system 140 includes at least one server device 142 and at least one data store 144. The server computing device 142 may include any appropriate type of computing device, such as described above for computing device 116 as well as computing devices with server-class hardware. In some embodiments, the server computing device 142 may include computer systems using clustered computers and components to act as a single pool of seamless resources. For example, such implementations may be used in a data center or to provide cloud computing resources. In some embodiments, back-end system 140 is deployed using a virtual machine(s). In some embodiments, the device 142 is sustainably similar to the computing device 410 depicted in FIG. 4.

In some embodiments, the data store 144 is a repository for persistently storing and managing collections of data. Example data stores that may be employed within the described system include data repositories, such as a database as well as simpler store types, such as files, emails, and so forth. In some embodiments, the data store 144 includes a database. In some embodiments, a database is a series of bytes or an organized collection of data that is managed by a database management system (DBMS).

In some embodiments, the back-end system 140 hosts one or more computer-implemented services, such as described below, provided by the described system with which users may interact. For example, the back-end system 140 may provide ride simulation data to various simulation devices (e.g., exercise equipment) based on the data (e.g., the rider data or the ride data) collected by the data collection unit 110 during a real-world ride.

In some embodiments, computer-implemented services hosted by the back-end system 140 employ a trained AI model. In some embodiments, the trained AI model is employed to process ride data, or a resistance model associated with a rider and a trail to determine a recommended cycling event for the rider. In some embodiments, the trained AI model is employed to process event data related to a cycling event to determine a set of riders for the cycling event. In some embodiments, the trained AI model is employed to process ride data, or a resistance model associated with a rider and a trail to determine a safety notification for the rider. In some embodiments, the trained AI model is employed to process a resistance model for a trail ride to determine a cycling simulation of the trail ride. In some embodiments, the output of the AI models is provided to the computing device 116 or a smart trainer device.

In some embodiments, the AI model is trained with performance histories for a plurality of riders, with previously received ride data collected during a plurality of rides on a plurality of trails, resistance models associated with a rider or a trail ride, or a combination thereof. In some embodiments, the data used to train the AI model is annotated data or assisted annotated data (supervised machine learning). In some embodiments, computer-implemented services retrain the AI model upon the receipt of additional rider data, resistance models, performance histories, the determined output of the model, or a combination thereof.

The architecture of the AI model may take any of a number of forms, such as conventional machine learning (e.g., Gaussian mixtures, support, vector machine, random forest, and the like.) or deep learning (e.g., deep convolutional neural networks). In some embodiments, the AI model is a conventional machine-learning model trained using deep learning where features are automatically extracted using deep convolutional layers. In such examples, these features are computed prior to training the AI model.

Rider

In some embodiments, the rider data includes the weight of the rider, which is provided by the rider or estimated.

In Some Embodiments, the Size of the Rider is Determined According to:

Size of Rider (Frontal area)=A(ft2)

Drag coefficient=Cd (combined calculations=Cd. A(ft2).

Equipment

In some embodiments, the bicycle data includes the weight of the bicycle, which is provided by the rider or estimated.

In Some Embodiments, Tire Circumference is Determined According to:

26 in is baseline=0, 27.5 in=−7% rollover resistance, 29 in=−17% rollover resistance).

In Some Embodiments, Tire Rolling Resistance is Determined According to:

F rolling=9.8067·cos(arctan(G/100))·W·Cπ unless know use below.

In some embodiments, type of tire is determined according to:

Specialized S-Works Ground Control 2BR with 2.3 in width, 650 grams in weight, with 3.2 mm knob height).

In some embodiments, tire PSI is determined according to:

for a tire above 25 psi=31.3 watts, 35 psi=27.2 watts).

Environment

In some embodiments, the wind/airspeed is determined according to:

$$Vas=Vgs+Vhw \text{(air speed=groundspeed+headwind).}$$

In some embodiments, the aerodynamic drag is determined according to:

$$F\ \text{drag}=0.5\cdot Cd\cdot A\cdot \text{Rho}\cdot V2 \text{ as (drag coefficient*frontal area*air density*groundspeed).}$$

In some embodiments, the Grade/pitch/gravity is determined according to:

$$F\ \text{gravity}=9.8067\cdot\sin(\arctan(G/100))\cdot W\text{(weight of bike \& rider \& gravitational force).}$$

In some embodiments, the combined resisting is determined according to:

$$F\ \text{resist}=F\ \text{gravity}+F\ \text{rolling}+F\ \text{drag (resistance force)}$$

In some embodiments, the Work/Joules is determined according to:

$$F\ \text{resist}\cdot D\text{(amount of work/joules to overcome resistance force at distance)}$$

In some embodiments, the Power/watts is determined according to:

$$P\ \text{wheel}=F\ \text{resist}\cdot Vgs\text{(amount of power/watts to overcome resistance at groundspeed)}$$

In some embodiments, the drive train loss is determined according to: User provided data or estimated at 2% F wheel=(1−Loss dt/100).

In some embodiments, the BodyPower is determined according to;

$$\text{Combined 1=BodyPower}=(1-\text{Loss dt}/100)-1\cdot[F\ \text{gravity}+F\ \text{rolling}+F\ \text{drag}]\cdot Vgs\text{(power produced for a constant speed traveled).}$$

$$\text{Combined 2=BodyPower}=(1-\text{Loss dt}/100)-1\cdot[(9.8067\cdot W\cdot[\sin(\arctan(G/100))+Crr\cdot\cos(\arctan(G/100))])+(0.5\cdot Cd\cdot A\cdot\text{Rho}\cdot(Vgs+Vhw)2)]\cdot Vgs\text{ (power produced for a given groundspeed velocity).}$$

$$\text{Combined 3=Groundspeed velocity if given power}=aV\ 3/gs+bV2/gs+cV\ gs+d\text{ (at higher speeds the power required is proportional to the cube of velocity):}$$

$$A=0.5\cdot Cd\cdot A\cdot\text{Rho}$$

$$b=Vhw\cdot Cd\cdot A\cdot\text{Rho}$$

$$c=(9.8067\cdot W\cdot[\sin(\arctan(G/100))+Crr\cdot\cos(\arctan(G/100))])+(0.5\cdot Cd\cdot A\cdot\text{Rho}\cdot V2hw)$$

$$d=-(1-\text{Loss dt}/100)\cdot\text{BodyPower}$$

Note: Cardano's Method (Girolamo Cardano 1501-1576) is one way to find a real root of a cubic equation that can be employed by the described system:

$$Q=(3ac-b2)/(9a2)$$

$$R=(9abc-27a2d-2b3)/(54a3)$$

$$S=3\sqrt{R}+\sqrt{Q}\dot{3}+R2$$

$$T=3\sqrt{R}-\sqrt{Q}3+R2$$

$$Vgs=S+T-(b/(3a)$$

Air Density

In some embodiments, the described system determines resistance by determining the partial pressure of the water vapor as well as the partial pressure of the dry air by using, for example, air temperature, air pressure, and dew point temperature inputs or relative humidity.

Knowing the dew point temperature, the system saturation vapor pressure is determined according to:

=Es (hPa) at that dew point. (hectopascal is a millibar, so 1 hPA=1 mb)

$$E_s(\text{hPa})=e_{so}/p^8 \qquad (1)$$

where:

$e_{so}$=6.1078

$p=c_0+T(c_1+T(c_2+T(c_3+T(c_4+T(c_5+T(c_6+T(c_7+T(c_8+T(c_9)))))))))$

T=air temperature (degrees Celsius)

$c_0=0.99999683$ $c_1=-0.90826951\cdot10^{-2}$ $c_2=0.78736169\cdot10^{-4}$ $c_3=-0.61117958\cdot10^{-6}$ $c_4=0.43884187\cdot10^{-8}$ $c_5=-0.29883885\cdot10^{-10}$ $c_6=0.21874425\cdot10^{-12}$ $c_7=-0.17892321\cdot10^{-14}$ $c_8=0.11112018\cdot10^{-16}$ $c_9=-0.30994571\cdot10^{-19}$ In some embodiments, the pressure of water vapor $P_v$ is found by using the dew point temperature $T_{dewpoint}$ (C) as T in equation (1).

$$P_v(\text{hPa})=E_s\text{ at }T_{dewpoint}(E_s\text{=saturation vapor pressure} \qquad 2)$$

In some embodiments, the pressure of dry air $P_d$ is determined given the measured air pressure P from a weather report and the water vapor pressure $P_v$ calculated from equation (2).

In some embodiments, the measured air pressure P is determined as the sum of the pressures of dry air $P_d$ and water vapor $P_v$.

$$P_d(\text{hPa})=P(\text{hPa})-P_v(\text{hPa}) \qquad (3)$$

In some embodiments, the air density Rho (kg/m$^3$) is determined according to $P_v$ and $P_d$.

$$\text{Rho (kg/m}^3)=(P_d/(R_d\cdot T_k))+(P_v/(R_v\cdot T_k)) \qquad (4)$$

Where $P_v$ (hPa) is from equation (2)

$P_d$ (hPa) is from equation (3)

$R_v$ is 461.4964

$R_d$ is 287.0531

$T_k$ is measured temperature in degrees Kelvin (i.e., measured temperature T (Celsius)+273.15)

Terrain

In some embodiments, the size of dynamic impact as measured by the suspension movement in milometers (where spring rate, damping rate, travel velocity, force displacement are known). In some embodiments, the type of bike provides the delta between the axles of the bike. In some embodiments, when the type of bike is not known, the system determines to know the when/where the terrain resistance is acting on the bike. In some embodiments, the type of ground (e.g., hard compact dirt, tacky dirt, sandy or gravel, concrete) is confirmed by a rider on location as well as observed by two different cameras.

Bike Sensors and Position:

In some embodiments, the bike suspension sensors 114 are attached to the suspension and continually measure the suspension movement at 2,000× a second. Additionally, in some embodiments, the sensors include an accelerometer, date and time data, as well as a geolocation sensor, temperature sensor, humidity sensor, barometric pressure sensor, speed sensor, power meter, cadence sensor. In some embodiments, the bike suspension sensors integrate wind reports as well as the weight of rider. In some embodiments, when the bicycle has suspension on both front and rear wheels, the horizontal distance and vertical distance between the wheel's axles is used to determine the terrain obstacle's location in reference to the bike according to:

$$\sqrt{(X2-X1)^2+(Y2-Y1)^2}$$

In some embodiments, the geometry of the bike and the suspension travel is known for the most accurate terrain simulation on the user's selected bike. Key factors of the bike geometry are listed below.

Head Tube Angle=given by user or estimated at 71 degrees

Fork Travel=given by user or estimated at 100 mm

Rear Axle Travel=given by user or estimated at 110 mm OR

Rear Shock Travel=given by user or estimated at 44 mm

In some embodiments, the sensors record the suspension movement at a known location (e.g., based on geolocation data). In some embodiments, a second GPS is employed to confirm the geolocation data for accuracy. In some embodiments, the recorded bike variables are known (e.g., weight, wheels, tires, tire PSI, head tube angle, fork travel, rear axle travel, rear shock travel, suspension spring rate, suspension damping rate, and sag) and are employed to calculate how many watts are necessary to overcome the terrain obstacle above and beyond the rider, equipment, and environment variables listed above.

Example:

If rider, equipment, and environmental variables are known during the time of the simulated recording at a speed of 5 mph that produces 11.47 watts of power and the suspension sensors identifies that at this point in time/geo location it recorded a 10 mm obstacle where the recording bike's power meter shows an increase of 3 watts, this allows us to calculate (build a database) to reference these terrain variables and their impact on the user's simulation based on the user defined variables. By pairing known environmental variables (obstacles) and performance variables (speed) with known resistance (watts), a computer that calculates the relationship of all variables can provide a very accurate dynamic simulation and the inter-dependence of the variables.

Dual Camera, Positions, Custom Rigging

In some embodiments, the data collection unit 110 includes at least two cameras (e.g., Camera 1 and Camera 2). In some embodiments, Camera 1 has a wide angle lens and is positioned just under the chin of the rider where the handlebars are in the lower roughly twenty percent of the frame. The wide lens provides the user a realistic front forward view of the ride (as compared to a portal view) and with the handlebars in the lower portion of the frame to give context to the speed/movement of the bike without significantly impacting rider view, just as if you were riding in real life.

In some embodiments, Camera 2 is a three-hundred and sixty degrees camera that is positioned above a helmet worn by the rider and attached to a custom rigging system that centers the camera on the rider/bike while being independent of the rider's head and neck that allows for a continuous filming without rider interference from movement. As Camera 2 is at the highest point (of all but the tallest of riders) to give an unobstructed view of the surroundings such as mountains on the left and lakes on the right. In some embodiments, during cycling events, Camera 2's elevated location allows the viewer to see the dynamic movement of the peloton and the camera's branches during the event as well as the critical time when the peloton is setting up to sprint to the finish. This view provides valuable tactical insight and analysis of the peloton dynamics post event as well as reply and rehearsal analysis for preparation of future events.

In some embodiments, the dual camera also provides visually, time/date stamps, and geolocation calibration to the external GPS data as well as the suspension data to ensure accuracy redundancy.

Example:

Camera 2 shows the actions of the peloton and how a seam opened up for a sprinter to shoot through the gap.

Example User-Interface Page/Tab

Figure 2:
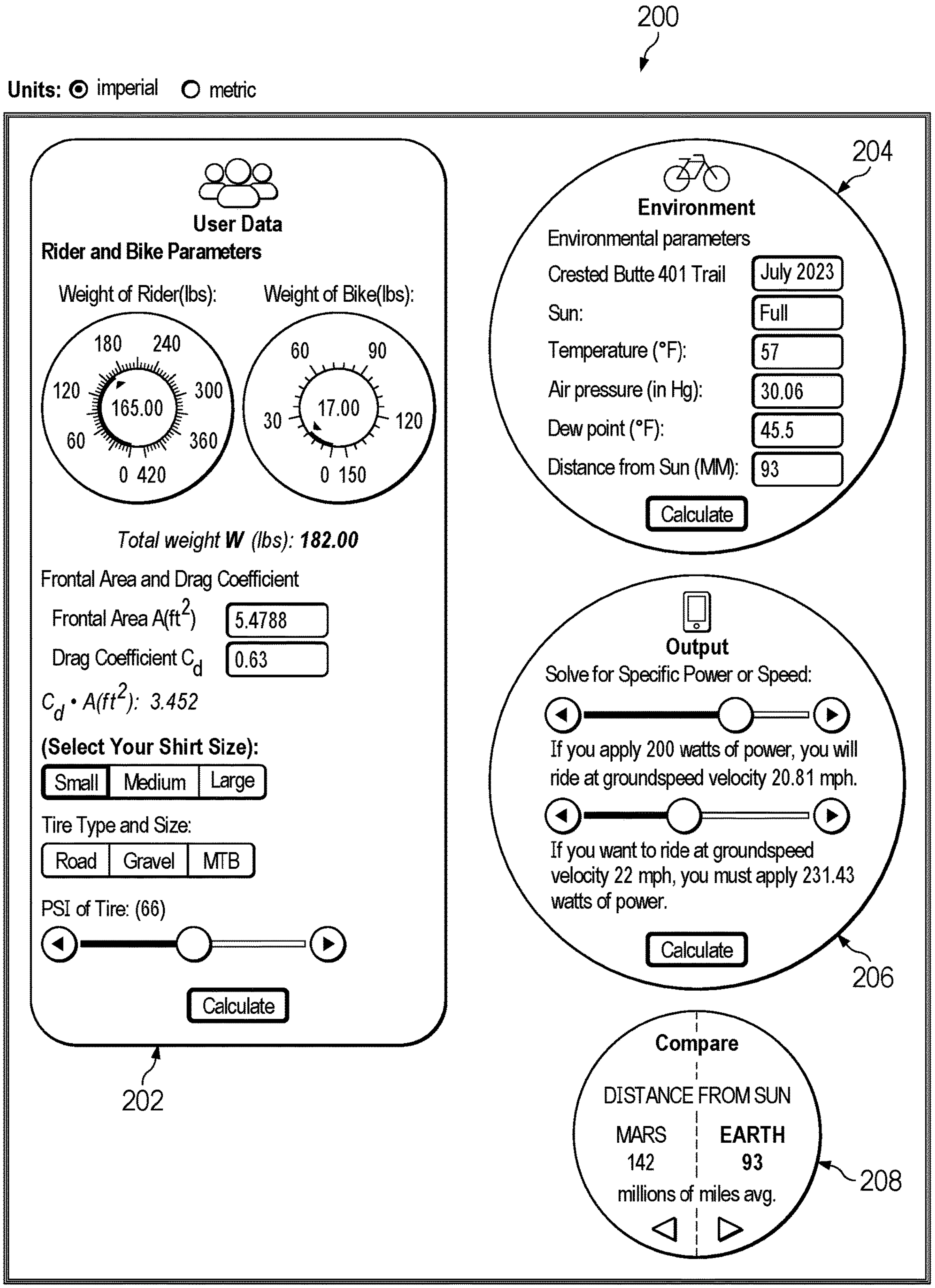
FIG. 2 depicts an example page that may be provided by a user-interface according to some aspects of this disclosure.
Figure 3A:
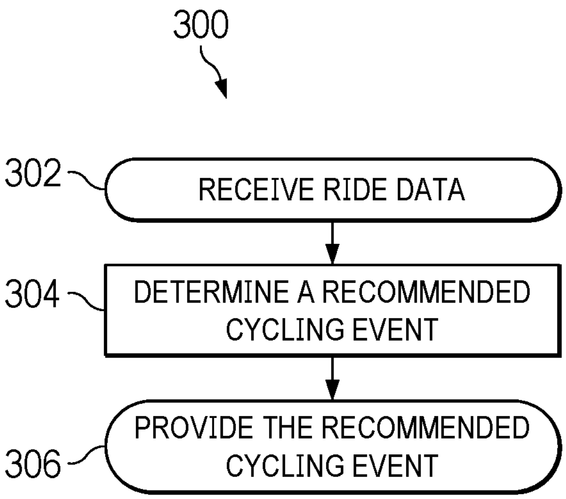
FIGS. 3A-3D each depict a flowchart of an example process according to some aspects.
Figure 3B:
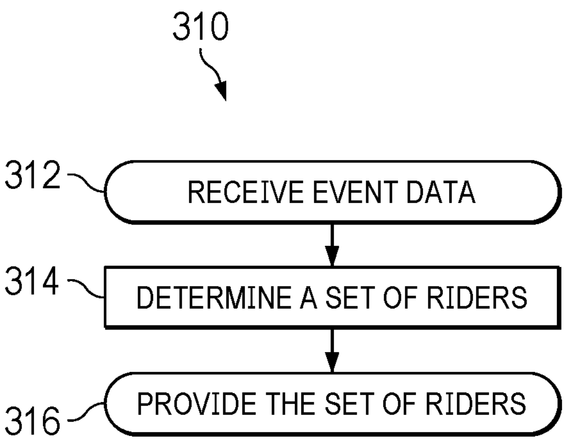
Figure 3C:
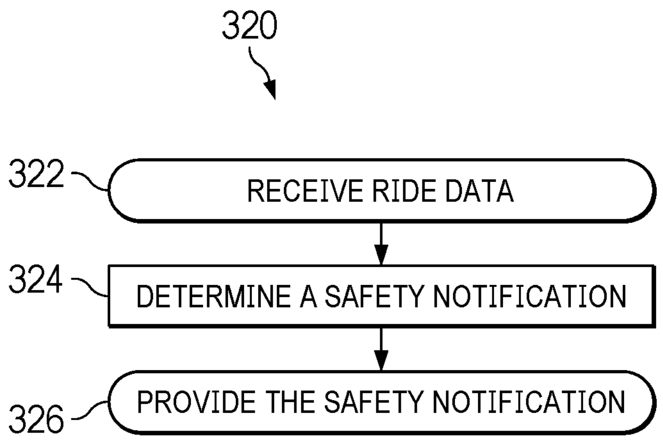
Figure 3D:
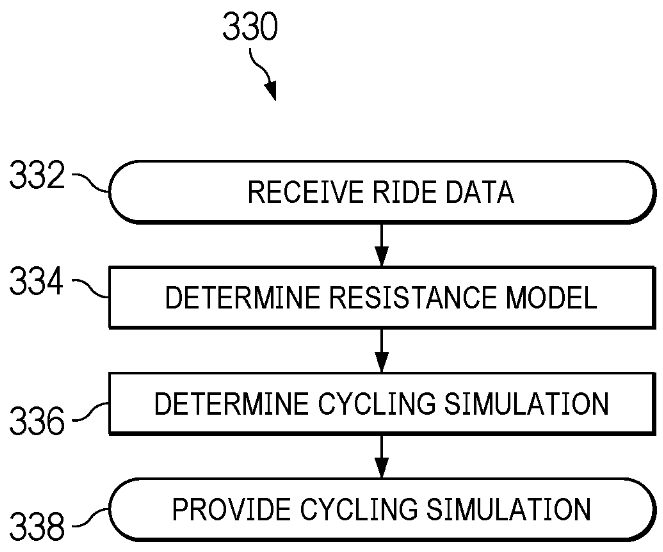

FIG. 2 depicts an example page 200 that may be provided by a user interface. For example, the example page 200 may be provided via the user interface 425 generated by the computing device 410 as described below with reference to FIG. 4. The example screen provides information based on a resistance model (or "resistance calculator," which is a term that may be used when presenting the information to a rider) that allows riders to experience riding their bike. Based on the amount of power/watts that the rider is creating, the system determines the speed at which the data points (e.g., the dual video, and physical obstacles data) impacts the rider's experience to create a dynamic cycling experience of real-world rides.

The example page 200 allows a rider to explore the relationship between a cycling power (wattage) and speed. As depicted, the example page 200, allows a rider to provide information related to their rider data 202 and a specific environment 204. The example page provides output via an output section 206 and a compare section 208. In some embodiments, the provided user interface shows a user their groundspeed velocity based on an applied number of watts (as determined by the resistance model described above) where the user can change the inputs to see/experience different outputs.

In some embodiments, the provided user interface may also provide pages/tabs for a Personalized Ride ratings and review and a ride/event library. The provided information can be personalized based on rider input data and updated according to the resistance model described above. For example, a rider may select a ride or event and the user interface shows the entire ride or event broken down into data defined segments that include detailed ride information that is both personalized and customized. Riders may also customize, for example, environmental data, such as temperature, dew point.

Example Processes

FIGS. 3A-3D each depict a flowchart of an example processes 300, 310, 320, and 330 respectively that can be implemented by examples of the present disclosure, for example, the systems and devices depicted in FIG. 1. The process 300 generally shows in more detail a method for determining a recommended cycling event. The process 310 generally shows in more detail a method for determining a set of riders for a cycling event. The process 320 generally shows in more detail A method for determining a safety notification to a rider of a bicycle on a trail. The process 330 generally shows in more detail a method for determining a cycling simulation of a trail ride.

For clarity of presentation, the description that follows generally describes the processes 300, 310, 320, and 330 in the context of FIGS. 1, 2, and 4. However, it will be understood that the processes 300, 310, 320, and 330 may be performed, for example, by other suitable system, environment, software, and hardware, or a combination of systems, environments, software, and hardware as appropriate. In some examples, various operations of the processes 300, 310, 320, and 330 can be run in parallel, in combination, in loops, or in a different order.

For process 300, at block 302, ride data associated with a rider of a bicycle and collected by a plurality of sensors during a ride on a trail is received. From block 302, the process 300 proceeds to block 304.

At 304, a recommended cycling event for the rider is determined by processing the ride data through an AI model trained with previously received ride data collected during a plurality of rides on a plurality of trails. From block 304, the process 300 proceeds to block 306.

At 306, the recommended cycling event is provided to a user device associated with the rider. After block 306, the process 300 ends.

For process 310, at block 312, event data associated with a cycling event is received. From block 312, the process 310 proceeds to block 314.

At block 314, a set of riders for the cycling event is determined by processing the event data through an AI model trained with a plurality of performance histories. In some embodiments, each of the performance histories is associated with one of a plurality of riders. In some embodiments, the set of riders is included in the plurality of riders. From block 314, the process 310 proceeds to block 316.

At block 316, the set of riders is provided to a user device. After block 316, the process 310 ends.

For process 320, at block 322, ride data associated with a rider of a bicycle and collected by a plurality of sensors during a ride on a trail is received. From block 322, the process 320 proceeds to block 324.

At block 324, a safety notification is determined by processing the ride data and a performance history associated with the rider through an AI model trained with previously received ride data collected during a plurality of rides on the trail. From block 324, the process 320 proceeds to block 326.

At block 326, based on the terrain and suspension data there are key points in the ride identified by GPS where caution should occur, both as a general rule but also based on the rider's data where the safety notification is provided to a user device associated with the rider. After block 326, the process 320 ends.

For process 330, at block 332, ride data collected by a plurality of sensors during a trail ride is received. In some embodiments, the ride data is segmented into a plurality of time segments. In some embodiments, the sensors are mounted to a bicycle or a rider of the bicycle. From block 332, the process 330 proceeds to block 334.

At block 334 a resistance model for the rider and the trail is determined by determining a resistance variable for each time segment based on the received ride data and determining a power variable necessary to overcome each of the resistance variables at each respective time segment based on a plurality of user specific variables. From block 334, the process 330 proceeds to block 336.

At block 336, a cycling simulation of the trail ride is determined based on the resistance model. From block 336, the process 330 proceeds to block 338.

At block 338, the cycling simulation of the trail ride is provided to a smart trainer device. After block 338, the process 330 ends.

Computing Devices and Processors

In some embodiments, the platforms, systems, media, and methods described herein include computing devices, processors, or use of the same. In further embodiments, the computing device includes one or more hardware central processing units (CPUs) or general-purpose graphics processing units (GPUs) that carry out the device's functions. In still further embodiments, the computing device further comprises an operating system configured to perform executable instructions. In some embodiments, the computing device is optionally connected to a computer network. In further embodiments, the computing device is optionally connected to the Internet such that it accesses the World Wide Web. In still further embodiments, the computing device is optionally connected to a cloud computing infrastructure. In other embodiments, the computing device is optionally connected to an intranet. In other embodiments, the computing device is optionally connected to a data storage device.

In accordance with the description herein, suitable computing devices include, by way of non-limiting examples, cloud computing resources, server computers, server clusters, desktop computers, laptop computers, notebook computers, sub-notebook computers, netbook computers, netpad computers, handheld computers, mobile smartphones, and tablet computers. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the computing device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the computing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In some embodiments, the computing device includes an input device to receive information from a user. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Computer control systems are provided herein that can be used to implement the platforms, systems, media, and methods of the disclosure. FIG. 4 an example system 400 that includes a computer or a computing device 410 that can be programmed or otherwise configured to implement platforms, systems, media, and methods of the present disclosure. For example, the computing device 410 can be programmed or otherwise configured such as the description regarding computing device 116 and 142 depicted in FIG. 1 as well as the processes 300-340 described with reference to FIGS. 3A-3D.

In the depicted embodiment, the computing device 410 includes a CPU (also "processor" and "computer processor" herein) 412, which is optionally a single core, a multi core processor, or a plurality of processors for parallel processing. The computing device 410 also includes memory or memory location 417 (e.g., random-access memory, read-only memory, flash memory), electronic storage unit 414 (e.g., hard disk), communication interface 415 (e.g., a network adapter) for communicating with one or more other systems, and peripheral devices 416, such as cache, other memory, data storage or electronic display adapters. In some examples, the computing device 410 includes more or fewer components than those illustrated in FIG. 4 and performs functions other than those described herein.

In some embodiments, the memory 417, storage unit 414, communication interface 415, and peripheral devices 416 are in communication with the CPU 412 through a communication bus (solid lines), such as a motherboard. In some examples, the bus of the computing device 410 includes multiple buses.

The computing device 410 is optionally operatively coupled to a computer network, such as the network 130 depicted in FIG. 1, with the aid of the communication interface 415. In some embodiments, the computing device 410 is configured as a back-end server deployed within an environment, such as the example environments depicted in FIG. 1.

In some embodiments, the CPU 412 can execute a sequence of machine-readable instructions, which can be embodied in a program or software. The instructions may be stored in a memory location, such as the memory 417. The instructions can be directed to the CPU 412, which can subsequently program or otherwise configure the CPU 412 to implement methods of the present disclosure. Examples of operations performed by the CPU 412 can include fetch, decode, execute, and write back. In some embodiments, the CPU 412 is part of a circuit, such as an integrated circuit. One or more other components of the computing device 410 can be optionally included in the circuit. In some embodiments, the circuit is an application specific integrated circuit (ASIC) or a field programmable gate array (FPGA).

In some examples, the memory 417 and storage unit 414 include one or more physical apparatuses used to store data or programs on a temporary or permanent basis. In some examples, the memory 417 is volatile memory and requires power to maintain stored information. In some examples, the storage unit 414 is non-volatile memory and retains stored information when the computer is not powered. In further examples, memory 417 or storage unit 414 is a combination of devices for example, those disclosed herein. In some examples, memory 417 or storage unit 414 is distributed across multiple machines, for example, a network-based memory or memory in multiple machines performing the operations of the computing device 410.

In some cases, the storage unit 414 is a data storage unit or data store for storing data. In some instances, the storage unit 414 stores files, for example, drivers, libraries, and saved programs. In some examples, the storage unit 414 stores user data (e.g., user preferences and user programs). In some examples, the computing device 410 includes one or more additional data storage units that are external, for example, located on a remote server that is in communication through an intranet or the Internet.

In some examples, methods as described herein are implemented by way of machine or computer executable code stored on an electronic storage location of the computing device 410, for example, on the memory 417 or the storage unit 414. In some examples, the electronic processor 412 is configured to execute the code. In some examples, the machine executable or machine-readable code is provided in the form of software. In some examples, during use, the code is executed by the electronic processor 412. In some cases, the code is retrieved from the storage unit 414 and stored on the memory 417 for ready access by the electronic processor 412. In some situations, the storage unit 414 is precluded, and machine-executable instructions are stored on the memory 417.

In some cases, the computing device 410 includes or is in communication with one or more output devices 420. In some cases, the output device 420 includes a display to send visual information to a user. In some cases, the output device 420 is a touch sensitive display that combines a display with a touch sensitive element that is operable to sense touch inputs as and functions as both the output device 420 and the input device 430. In still further cases, the output device 420 is a combination of devices for example, those disclosed herein. In some cases, the output device 420 displays a user interface 425 generated by the computing device 410 (for example, software executed by the computing device 410).

In some cases, the computing device 410 includes or is in communication with one or more input devices 430 that are configured to receive information from a user. Suitable input devices include a keyboard, a cursor-control device, a touch-screen, a microphone, and a camera.

In some cases, the computing device 410 includes an operating system configured to perform executable instructions. The operating system is, for example, software, including programs and data that manages the device's hardware and provides services for execution of applications.

Machine Learning

In some embodiments, machine-learning algorithms are employed to build an AI model, such as described above. Examples of machine-learning algorithms may include a support vector machine (SVM), a naïve Bayes classification, a random forest, a neural network, deep learning, or other supervised learning algorithm or unsupervised learning algorithm for classification and regression. The machine-learning algorithms may be trained using one or more training datasets. For example, previously received ride data or rider data may be employed to train various algorithms. Moreover, as described above, these algorithms can be continuously trained/retrained using real-time user data as it is received. In some embodiments, the machine-learning algorithm employs regression modelling where relationships between variables are determined and weighted.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computing device's CPU, written to perform one or more specified tasks. Computer readable instructions may be implemented as program modules, such as functions, objects, APIs, data structures, and the like, which perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more applications, extensions, add-ins, or add-ons, or combinations thereof.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of data records. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, MongoDB, Oracle, DB2, and Sybase. In some embodiments, a database is web-based. In still further embodiments, a database is cloud computing based. In other embodiments, a database is based on one or more local computer storage devices.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms “comprises,” “comprising,” “has,” “having,” “includes,” “including,” “contains,” “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a,” “has . . . a,” “includes . . . a,” or “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially,” “essentially,” “approximately,” “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way but may also be configured in ways that are not listed. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

EXAMPLE EMBODIMENTS

The following paragraphs provide various examples of the embodiments disclosed herein.

Example 1 is a method for determining a cycling simulation of during a ride on a trail. The method includes receiving ride data collected by a plurality of sensors during a ride on a trail. The ride data is segmented into a plurality of time segments. The plurality of sensors are mounted to a bicycle or a rider of the bicycle. The method further includes determining a resistance model for the rider and the ride by determining a resistance variable for each time segment based on the received ride data, and determining a power variable necessary to overcome each of the resistance variable at each respective time segment based on a plurality of user specific variables. The method further includes determining a cycling simulation of the ride based on the resistance model, and providing the cycling simulation of the ride to a smart trainer device.

Example 2 includes the subject matter of Example 1, and further specifies that the ride data includes user defined data.

Example 3 includes the subject matter of any of Examples 1 and 2, and further specifies that the user defined data includes rider data, equipment data, environment data, and terrain data.

Example 4 includes the subject matter of any of Examples 1-3, and further specifies that the rider data includes a weight of the rider, the size of the rider, and a riding position of the rider.

Example 5 includes the subject matter of any of Examples 1-4, and further specifies that the equipment data includes a weight of the bicycle, type of wheel, type of tires, tire psi, head tube angle, fork travel, rear axle travel, rear shock travel, suspension spring rate, suspension damping rate, and sag.

Example 6 includes the subject matter of any of Examples 1-5, and further specifies that determining the resistance variable for each time segment includes identifying an obstacle and determining a watts difficulty rating for the obstacle.

Example 7 includes the subject matter of any of Examples 1-6, and further specifies that each of the power variables includes an amount of watts necessary to overcome the watts difficulty rating for the obstacle included in the respective resistance variable.

Example 8 includes the subject matter of any of Examples 1-7, and further specifies that each of the power variables includes an amount watts necessary to overcome the respective resistance variable to travel at a set speed.

Example 9 includes the subject matter of any of Examples 1-8, and further specifies that the bicycle includes a suspension.

Example 10 includes the subject matter of any of Examples 1-9, and further specifies that the plurality of sensors include a suspension sensor configured to measure a physical impact on the suspension.

Example 11 includes the subject matter of any of Examples 1-10, and further specifies that the movement of the suspension is measured in milometers.

Example 12 includes the subject matter of any of Examples 1-11, and further specifies that the plurality of sensors include a first camera and a second camera configured to record image data.

Example 13 includes the subject matter of any of Examples 1-12, and further specifies that the first camera includes a wide angled lens and is positioned under the chin of the rider.

Example 14 includes the subject matter of any of Examples 1-13, and further specifies that the second camera includes a three-hindered and sixty degrees camera that is positioned above a helmet worn by the rider and attached to a rigging system that centers the camera on the rider while being independent of the rider’s head and neck.

Example 15 includes the subject matter of any of Examples 1-14, and further specifies that the plurality of sensors include a geolocation device configured to record position data.

Example 16 includes the subject matter of any of Examples 1-15, and further specifies that the ride data includes the image data and the position data recorded during the ride.

Example 17 includes the subject matter of any of Examples 1-16, and further specifies that the determining the resistance variable for each time segment includes determining obstacles by pairing the image data and the position data.

Example 18 includes the subject matter of any of Examples 1-17, and further specifies that the time segments are determined based on timestamps associated with the ride data as metadata.

Example 19 includes the subject matter of any of Examples 1-18, and further specifies that an increment between time segments is one microsecond.

Example 20 includes the subject matter of any of Examples 1-19, and further specifies that the cycling simulation of the ride is determined by processing the resistance model through an AI model trained with previously received ride data collected during a plurality of rides on a plurality of trails.

Example 21 includes the subject matter of any of Examples 1-20, and further includes retraining the AI model with the resistance model.

Example 22 is a non-transitory computer-readable medium that includes instructions executable by an electronic processor to perform a set of functions. The set of functions includes receiving ride data collected by a plurality of sensors during a ride on a trail. The ride data is segmented into a plurality of time segments. The plurality of sensors are mounted to a bicycle or a rider of the bicycle. The set of instructions further includes determining a resistance model for the rider and the trail by determining a resistance variable for each time segment based on the received ride data, and determining a power variable necessary to overcome each of the resistance variable at each respective time segment based on a plurality of user specific variables. The set of instructions further includes determining a cycling simulation of the ride based on the resistance model, and providing the cycling simulation of the ride to a smart trainer device.

Example 23 includes the subject matter of Example 22, and further specifies that the ride data includes user defined data.

Example 24 includes the subject matter of any of Examples 22 and 23, and further specifies that the user defined data includes rider data, equipment data, environment data, and terrain data.

Example 25 includes the subject matter of any of Examples 22-24, and further specifies that the rider data includes a weight of the rider, the size of the rider, and a riding position of the rider.

Example 26 includes the subject matter of any of Examples 22-25, and further specifies that the equipment data includes a weight of the bicycle, type of wheel, type of tires, tire psi, head tube angle, fork travel, rear axle travel, rear shock travel, suspension spring rate, suspension damping rate, and sag.

Example 27 includes the subject matter of any of Examples 22-26, and further specifies that determining the resistance variable for each time segment includes identifying an obstacle and determining a watts difficulty rating for the obstacle.

Example 28 includes the subject matter of any of Examples 22-27, and further specifies that each of the power variables includes an amount of watts necessary to overcome the watts difficulty rating for the obstacle included in the respective resistance variable.

Example 29 includes the subject matter of any of Examples 22-28, and further specifies that each of the power variables includes an amount watts necessary to overcome the respective resistance variable to travel at a set speed.

Example 30 includes the subject matter of any of Examples 22-29, and further specifies that the bicycle includes a suspension.

Example 31 includes the subject matter of any of Examples 22-30, and further specifies that the plurality of sensors include a suspension sensor configured to measure a physical impact on the suspension.

Example 32 includes the subject matter of any of Examples 22-31, and further specifies that the movement of the suspension is measured in milometers.

Example 33 includes the subject matter of any of Examples 22-32, and further specifies that the plurality of sensors include a first camera and a second camera configured to record image data.

Example 34 includes the subject matter of any of Examples 22-33, and further specifies that the first camera includes a wide angled lens and is positioned under the chin of the rider.

Example 35 includes the subject matter of any of Examples 22-34, and further specifies that the second camera includes a three-hindered and sixty degrees camera that is positioned above a helmet worn by the rider and attached to a rigging system that centers the camera on the rider while being independent of the rider's head and neck.

Example 36 includes the subject matter of any of Examples 22-35, and further specifies that the plurality of sensors include a geolocation device configured to record position data.

Example 37 includes the subject matter of any of Examples 22-36, and further specifies that the ride data includes the image data and the position data recorded during the ride.

Example 38 includes the subject matter of any of Examples 22-37, and further specifies that the determining the resistance variable for each time segment includes determining obstacles by pairing the image data and the position data.

Example 39 includes the subject matter of any of Examples 22-38, and further specifies that the time segments are determined based on timestamps associated with the ride data as metadata.

Example 40 includes the subject matter of any of Examples 22-39, and further specifies that an increment between time segments is one microsecond.

Example 41 includes the subject matter of any of Examples 22-40, and further specifies that the cycling simulation of the ride is determined by processing the resistance model through an AI model trained with previously received ride data collected during a plurality of rides on a plurality of trails.

Example 42 includes the subject matter of any of Examples 22-41, and further specifies that the set of functions further includes retraining the AI model with the resistance model.

Example 43 is a system for determining a cycling simulation of a ride on a trail. The system includes a bicycle, a plurality of sensors, a smart trainer device, and an electronic processor. The electronic processor is configured to receive ride data collected by the plurality of sensors during a ride on a trail. The ride data is segmented into a plurality of time segments. The plurality of sensors are mounted to the bicycle or a rider of the bicycle. The electronic processor is further configured to determine a resistance model for the rider and the trail by: determining a resistance variable for each time segment based on the received ride data, and determining a power variable necessary to overcome each of the resistance variable at each respective time segment based on a plurality of user specific variables. The electronic processor is further configured to determine a cycling simulation of the ride based on the resistance model, and provide the cycling simulation of the ride to the smart trainer device.

Example 44 includes the subject matter of Example 43, and further specifies that the ride data includes user defined data.

Example 45 includes the subject matter of any of Examples 43 and 44, and further specifies that the user defined data includes rider data, equipment data, environment data, and terrain data.

Example 46 includes the subject matter of any of Examples 43-45, and further specifies that the rider data includes a weight of the rider, the size of the rider, and a riding position of the rider.

Example 47 includes the subject matter of any of Examples 43-46, and further specifies that the equipment data includes a weight of the bicycle, type of wheel, type of tires, tire psi, head tube angle, fork travel, rear axle travel, rear shock travel, suspension spring rate, suspension damping rate, and sag.

Example 48 includes the subject matter of any of Examples 43-47, and further specifies that determining the resistance variable for each time segment includes identifying an obstacle and determining a watts difficulty rating for the obstacle.

Example 49 includes the subject matter of any of Examples 43-48, and further specifies that each of the power variables includes an amount of watts necessary to overcome the watts difficulty rating for the obstacle included in the respective resistance variable.

Example 50 includes the subject matter of any of Examples 43-49, and further specifies that each of the power variables includes an amount watts necessary to overcome the respective resistance variable to travel at a set speed.

Example 51 includes the subject matter of any of Examples 43-50, and further specifies that the bicycle includes a suspension.

Example 52 includes the subject matter of any of Examples 43-51, and further specifies that the plurality of sensors include a suspension sensor configured to measure a physical impact on the suspension.

Example 53 includes the subject matter of any of Examples 43-52, and further specifies that the movement of the suspension is measured in milometers.

Example 54 includes the subject matter of any of Examples 43-53, and further specifies that the plurality of sensors include a first camera and a second camera configured to record image data.

Example 55 includes the subject matter of any of Examples 43-54, and further specifies that the first camera includes a wide angled lens and is positioned under the chin of the rider.

Example 56 includes the subject matter of any of Examples 43-55, and further specifies that the second camera includes a three-hindered and sixty degrees camera that is positioned above a helmet worn by the rider and attached to a rigging system that centers the camera on the rider while being independent of the rider's head and neck.

Example 57 includes the subject matter of any of Examples 43-56, and further specifies that the plurality of sensors include a geolocation device configured to record position data.

Example 58 includes the subject matter of any of Examples 43-57, and further specifies that the ride data includes the image data and the position data recorded during the ride, and Example 59 includes the subject matter of any of Examples 43-58, and further specifies that the determining the resistance variable for each time segment includes determining obstacles by pairing the image data and the position data.

Example 60 includes the subject matter of any of Examples 43-59, and further specifies that the time segments are determined based on timestamps associated with the ride data as metadata.

Example 61 includes the subject matter of any of Examples 43-60, and further specifies that an increment between time segments is one microsecond.

Example 62 includes the subject matter of any of Examples 43-61, and further specifies that the cycling simulation of the ride is determined by processing the resistance model through an AI model trained with previously received ride data collected during a plurality of rides on a plurality of trails.

Example 63 includes the subject matter of any of Examples 43-62, and further specifies that the electronic processor is further configured to retrain the AI model with the resistance model.

Example 64 is a method for determining a recommended cycling event. The method includes receiving ride data associated with a rider of a bicycle and collected by a plurality of sensors during a ride on a trail, determining a recommended cycling event for the rider by processing the ride data through an AI model trained with previously received ride data collected during a plurality of rides on a plurality of trails, and providing the recommended cycling event to a user device associated with the rider.

Example 65 includes the subject matter of Example 64, and further specifies that the ride data is segmented into a plurality of time segments.

Example 66 includes the subject matter of any of Examples 64 and 65, and further includes determining a resistance variable for each time segment based on the received ride data, and determining a power variable necessary to overcome each of the resistance variable at each respective time segment based on a plurality of user specific variables.

Example 67 includes the subject matter of any of Examples 64-66, and further specifies that the recommended cycling event is determined by processing the resistance model through the AI model.

Example 68 includes the subject matter of any of Examples 64-67, and further includes retraining the AI model with the resistance model.

Example 69 includes the subject matter of any of Examples 64-68, and further includes determining a plurality of resistance models for the rider, and determining a performance history for the rider based on the plurality of resistance models.

Example 70 includes the subject matter of any of Examples 64-69, and further specifies each of the plurality of resistance models is determined based on additional ride data collected during another ride on the trail or a ride on a different trail.

Example 71 includes the subject matter of any of Examples 64-70, and further specifies that the recommended cycling event is determined by processing the performance history and the plurality of resistance models through the AI model.

Example 72 includes the subject matter of any of Examples 64-71, and further specifies that the plurality of sensors are mounted to the bicycle or the rider of the bicycle.

Example 73 includes the subject matter of any of Examples 64-72, and further specifies that the bicycle includes a smart trainer device.

Example 74 includes the subject matter of any of Examples 64-73, and further specifies that the ride includes a cycling simulation of the trail.

Example 75 includes the subject matter of any of Examples 64-74, and further specifies that the recommended cycling event is associated with one of the plurality of trails.

Example 76 includes the subject matter of any of Examples 64-75, and further specifies that the plurality of trails includes the trail.

Example 77 includes the subject matter of any of Examples 64-75, and further specifies that the plurality of trails does not include the trail.

Example 78 includes the subject matter of any of Examples 64-77, and further specifies that the ride data includes atmosphere, terrain, environment, and rider specific data.

Example 79 includes the subject matter of any of Examples 64-78, and further includes determining a predicted performance of the rider for the recommended cycling event by processing the ride data through the AI model.

Example 80 includes the subject matter of any of Examples 64-79, and further specifies that the AI model is trained to consider a profile of the rider, the altitude of the trail, a difficulty level associated with the trail, a condition of the trail during the ride, and event data associated with the recommended cycling event.

Example 81 includes the subject matter of any of Examples 64-80, and further specifies that the profile of the rider includes at least one of the age of the rider, the weight of the rider, a location of the rider, the number and frequency of previous rides by the rider, the number and type of bicycles associated with the rider, a preferred event type, and preferred event difficulty.

Example 82 includes the subject matter of any of Examples 64-81, and further specifies that the event data includes as least one of a weather forecast for the recommended cycling event, a location of the recommended cycling event, a type or category for the recommended cycling event, and trail data associated with an event trail.

Example 83 includes the subject matter of any of Examples 64-82, and further specifies that the trail data includes at least one of an average altitude of the event trail, a difficulty level associated with the event trail, and event outing data.

Example 84 is a cycling event recommendation system. The system includes a bicycle having a plurality of sensors, a user device associated with a rider; and an electronic processor. The electronic processor is configured to receive ride data associated with a rider of a bicycle and collected by a plurality of sensors during a ride on a trail; determine a recommended cycling event for the rider by processing the ride data through an AI model trained with previously received ride data collected during a plurality of rides on a plurality of trails, and provide the recommended cycling event to the user device.

Example 85 includes the subject matter of Example 84, and further specifies that the ride data is segmented into a plurality of time segments.

Example 86 includes the subject matter of any of Examples 84 and 85, and further specifies that the electronic processor is further configured to determine a resistance model for the rider and the trail by: determining a resistance variable for each time segment based on the received ride data, and determining a power variable necessary to overcome each of the resistance variable at each respective time segment based on a plurality of user specific variables.

Example 87 includes the subject matter of any of Examples 84-86, and further specifies that the recommended cycling event is determined by processing the resistance model through the AI model.

Example 88 includes the subject matter of any of Examples 84-87, and further specifies that the electronic processor is further configured to retrain the AI model with the resistance model.

Example 89 includes the subject matter of any of Examples 84-88, and further specifies that the electronic processor is further configured to determine a plurality of resistance models for the rider and determine a performance history for the rider based on the plurality of resistance models.

Example 90 includes the subject matter of any of Examples 84-89, and further specifies that each of the plurality of resistance models is determined based on additional ride data collected during another ride on the trail or a ride on a different trail, Example 91 includes the subject matter of any of Examples 84-90, and further specifies that the recommended cycling event is determined by processing the performance history and the plurality of resistance models through the AI model.

Example 92 includes the subject matter of any of Examples 84-91, and further specifies that the plurality of sensors are mounted to the bicycle or the rider of the bicycle.

Example 93 includes the subject matter of any of Examples 84-92, and further specifies that the bicycle includes a smart trainer device.

Example 94 includes the subject matter of any of Examples 84-93, and further specifies that the ride includes a cycling simulation of the trail.

Example 95 includes the subject matter of any of Examples 84-94, and further specifies that the recommended cycling event is associated with one of the plurality of trails.

Example 96 includes the subject matter of any of Examples 84-95, and further specifies that the plurality of trails includes the trail.

Example 97 includes the subject matter of any of Examples 84-95, and further specifies that the plurality of trails does not include the trail.

Example 98 includes the subject matter of any of Examples 84-97, and further specifies that the ride data includes atmosphere, terrain, environment, and rider specific data.

Example 99 includes the subject matter of any of Examples 84-98, and further specifies that the electronic processor is further configured to determine a predicted performance of the rider for the recommended cycling event by processing the ride data through the AI model.

Example 100 includes the subject matter of any of Examples 84-99, and further specifies that the AI model is trained to consider a profile of the rider, the altitude of the trail, a difficulty level associated with the trail, a condition of the trail during the ride, and event data associated with the recommended cycling event.

Example 101 includes the subject matter of any of Examples 84-100, and further specifies that the profile of the rider includes at least one of the age of the rider, the weight of the rider, a location of the rider, the number and frequency of previous rides by the rider, the number and type of bicycles associated with the rider, a preferred event type, and preferred event difficulty.

Example 102 includes the subject matter of any of Examples 84-101, and further specifies that the event data includes as least one of a weather forecast for the recommended cycling event, a location of the recommended cycling event, a type or category for the recommended cycling event, and trail data associated with an event trail.

Example 103 includes the subject matter of any of Examples 84-102, and further specifies that the trail data includes at least one of an average altitude of the event trail, a difficulty level associated with the event trail, and event outing data.

Example 104 is a method for determining a set of riders for a cycling event. The method includes receiving event data associated with a cycling event, and determining a set of riders for the cycling event by processing the event data through an AI model trained with a plurality of performance histories. Each of the plurality of performance histories is associated with one of a plurality of riders. The set of riders is included in the plurality of riders. The method further includes providing the set of riders to a user device.

Example 105 includes the subject matter of Example 104, and further specifies that each of the plurality of performance histories is determined based on a plurality of resistance models associated with the respective rider.

Example 106 includes the subject matter of any of Examples 104 and 105, and further specifies that each of the plurality of resistance models is determined based on ride data collected by a plurality of sensors during a ride on a trail.

Example 107 includes the subject matter of any of Examples 104-106, and further specifies that the ride data includes atmosphere, terrain, environment, and rider specific data.

Example 108 includes the subject matter of any of Examples 104-107, and further specifies that the plurality of sensors are mounted to a bicycle or the rider.

Example 109 includes the subject matter of any of Examples 104-108, and further specifies that the bicycle includes a smart trainer device.

Example 110 includes the subject matter of any of Examples 104-109, and further specifies that the ride includes a cycling simulation of the trail.

Example 111 includes the subject matter of any of Examples 104-110, and further includes determining a predicted performance for each of the set of riders for the cycling event by processing the ride data through the AI model.

Example 112 includes the subject matter of any of Examples 104-111, and further specifies that the AI model is trained to consider a profile of each of the set of riders, the altitude of a trail associated with the cycling event, a difficulty level associated with the trail, and event data associated with the cycling event.

Example 113 includes the subject matter of any of Examples 104-112, and further specifies that the profile of each of the set of riders includes at least one of the age of the respective rider, the weight of the respective rider, a location of the respective rider, the number and frequency of previous rides by the respective rider, the number and type of bicycles associated with the respective rider, a preferred event type, and preferred event difficulty.

Example 114 includes the subject matter of any of Examples 104-113, and further specifies that the event data includes as least one of a weather forecast for the cycling event, a location of the cycling event, a type or category for the cycling event, and trail data associated with an event trail.

Example 115 includes the subject matter of any of Examples 104-114, and further specifies that the trail data includes at least one of an average altitude of the event trail, a difficulty level associated with the event trail, and event outing data.

Example 116 is a rider recommendation system. The system includes a user device associated with a coordinator of a cycling event and an electronic processor. The electronic processor is configured to receive event data associated with the cycling event, and determine a set of riders for the cycling event by processing the event data through an AI model trained with a plurality of performance histories. Each of the plurality of performance histories is associated with one of a plurality of riders. The set of riders is included in the plurality of riders. The electronic processor is further configured to provide the set of riders to the user device.

Example 117 includes the subject matter of Example 116, and further specifies that each of the plurality of performance histories is determined based on a plurality of resistance models associated with the respective rider.

Example 118 includes the subject matter of any of Examples 116 and 117, and further specifies that each of the plurality of resistance models is determined based on ride data collected by a plurality of sensors during a ride on a trail.

Example 119 includes the subject matter of any of Examples 116-118, and further specifies that the ride data includes atmosphere, terrain, environment, and rider specific data.

Example 120 includes the subject matter of any of Examples 116-119, and further specifies that the plurality of sensors are mounted to a bicycle or the rider.

Example 121 includes the subject matter of any of Examples 116-120, and further specifies that the bicycle includes a smart trainer device.

Example 122 includes the subject matter of any of Examples 116-121, and further specifies that the ride includes a cycling simulation of the trail.

Example 123 includes the subject matter of any of Examples 116-122, and further specifies that the electronic processor is further configured to determine a predicted performance for each of the set of riders for the cycling event by processing the ride data through the AI model.

Example 124 includes the subject matter of any of Examples 116-123, and further specifies that the AI model is trained to consider a profile of each of the set of riders, the altitude of a trail associated with the cycling event, a difficulty level associated with the trail, and event data associated with the cycling event.

Example 125 includes the subject matter of any of Examples 116-124, and further specifies that the profile of each of the set of riders includes at least one of the age of the respective rider, the weight of the respective rider, a location of the respective rider, the number and frequency of previous rides by the respective rider, the number and type of bicycles associated with the respective rider, a preferred event type, and preferred event difficulty.

Example 126 includes the subject matter of any of Examples 116-125, and further specifies that the event data includes as least one of a weather forecast for the cycling event, a location of the cycling event, a type or category for the cycling event, and trail data associated with an event trail.

Example 127 includes the subject matter of any of Examples 116-126, and further specifies that the trail data includes at least one of an average altitude of the event trail, a difficulty level associated with the event trail, and event outing data.

Example 128 is a method for determining a safety notification to a rider of a bicycle on a trail. The method includes receiving ride data associated with a rider of a bicycle and collected by a plurality of sensors during a ride on a trail, determining a safety notification by processing the ride data and a performance history associated with the rider through an AI model trained with previously received ride data collected during a plurality of rides on the trail, and providing the safety notification to a user device associated with the rider.

Example 129 includes the subject matter of Example 128, and further specifies that the ride data is segmented into a plurality of time segments.

Example 130 includes the subject matter of any of Examples 128 and 129, and further includes determining a resistance model for the rider and the trail by: determining a resistance variable for each time segment based on the received ride data; and determining a power variable necessary to overcome each of the resistance variable at each respective time segment based on a plurality of user specific variables.

Example 131 includes the subject matter of any of Examples 128-130, and further includes retraining the AI model with the resistance model.

Example 132 includes the subject matter of any of Examples 128-131, and further includes determining a training plan or an update to the training plan by processing the ride data and the performance history through the AI model trained.

Example 133 includes the subject matter of any of Examples 128-132, and further specifies that the safety notification includes information regarding trail hazards.

Example 134 includes the subject matter of any of Examples 128-133, and further specifies that the performance history is determined based on a plurality of resistance models for the rider determined based on additional ride data collected during another ride on the trail or a ride on a different trail.

Example 135 includes the subject matter of any of Examples 128-134, and further specifies that the plurality of sensors are mounted to the bicycle or the rider of the bicycle.

Example 136 includes the subject matter of any of Examples 128-135, and further specifies that the bicycle includes a smart trainer device.

Example 137 includes the subject matter of any of Examples 128-136, and further specifies that the ride includes a cycling simulation of the trail.

Example 138 includes the subject matter of any of Examples 128-137, and further specifies that the ride data includes atmosphere, terrain, environment, and rider specific data.

Example 139 includes the subject matter of any of Examples 128-138, and further specifies that the AI model is trained to consider a profile of the rider, the altitude of the trail, the difficulty of the trail, a condition of the trail during the ride, and event data associated with the recommended cycling event.

Example 140 includes the subject matter of any of Examples 128-139, and further specifies that the profile of the rider includes at least one of the age of the rider, the weight of the rider, a location of the rider, the number and frequency of previous rides by the rider, the number and type of bicycles associated with the rider, a preferred event type, and preferred event difficulty.

Example 141 includes the subject matter of any of Examples 128-140, and further specifies that the event data includes as least one of a weather forecast for the recommended cycling event, a location of the recommended cycling event, a type or category for the recommended cycling event, and trail data associated with an event trail.

Example 142 includes the subject matter of any of Examples 128-141, and further specifies that the trail data includes at least one of an average altitude of the event trail, a difficulty level associated with the event trail, and event outing data.

Example 143 is a cycling event recommendation system. The system includes a bicycle having a plurality of sensors, a user device associated with a rider of the bicycle, and an electronic processor. The electronic processor is configured to receive ride data associated with the rider and collected by the plurality of sensors during a ride on a trail; determine a safety notification by processing the ride data and a performance history associated with the rider through an AI model trained with previously received ride data collected during a plurality of rides on the trail, and provide the safety notification to the user device.

Example 144 includes the subject matter of Example 143, and further specifies that the ride data is segmented into a plurality of time segments.

Example 145 includes the subject matter of any of Examples 143 and 144, and further specifies that the electronic processor is further configured to determine a resistance model for the rider and the trail by determining a resistance variable for each time segment based on the received ride data, and determining a power variable necessary to overcome each of the resistance variable at each respective time segment based on a plurality of user specific variables.

Example 146 includes the subject matter of any of Examples 143-145, and further specifies that the electronic processor is further configured to retrain the AI model with the resistance model.

Example 147 includes the subject matter of any of Examples 143-146, and further specifies that the electronic processor is further configured to determine a training plan or an update to the training plan by processing the ride data and the performance history through the AI model trained.

Example 148 includes the subject matter of any of Examples 143-147, and further specifies that the safety notification includes information regarding trail hazards.

Example 149 includes the subject matter of any of Examples 143-148, and further specifies that the performance history is determined based on a plurality of resistance models for the rider determined based on additional ride data collected during another ride on the trail or a ride on a different trail.

Example 150 includes the subject matter of any of Examples 143-149, and further specifies that the plurality of sensors are mounted to the bicycle or the rider of the bicycle.

Example 151 includes the subject matter of any of Examples 143-150, and further specifies that the bicycle includes a smart trainer device.

Example 152 includes the subject matter of any of Examples 143-151, and further specifies that the ride includes a cycling simulation of the trail.

Example 153 includes the subject matter of any of Examples 143-152, and further specifies that the ride data includes atmosphere, terrain, environment, and rider specific data.

Example 154 includes the subject matter of any of Examples 143-153, and further specifies that the AI model is trained to consider a profile of the rider, the altitude of the trail, the difficulty of the trail, a condition of the trail during the ride, and event data associated with the recommended cycling event.

Example 155 includes the subject matter of any of Examples 143-154, and further specifies that the profile of the rider includes at least one of the age of the rider, the weight of the rider, a location of the rider, the number and frequency of previous rides by the rider, the number and type of bicycles associated with the rider, a preferred event type, and preferred event difficulty.

Example 156 includes the subject matter of any of Examples 143-155, and further specifies that the event data includes as least one of a weather forecast for the recommended cycling event, a location of the recommended cycling event, a type or category for the recommended cycling event, and trail data associated with an event trail.

Example 157 includes the subject matter of any of Examples 143-156, and further specifies that the trail data includes at least one of an average altitude of the event trail, a difficulty level associated with the event trail, and event outing data.

What is claimed is:

1. A method for determining a cycling simulation of a ride on a trail, the method comprising:

receiving ride data collected by a plurality of sensors during a ride, wherein the ride data is segmented into a plurality of time segments, and wherein the plurality of sensors are mounted to a bicycle or a rider of the bicycle;

determining a resistance model for the rider and the trail by:

determining a resistance variable for each of the plurality of time segments based on the received ride data, and determining, for each of the plurality of time segments, a power variable necessary to overcome the respective resistance variable based on a plurality of user-specific variables, wherein each power variable includes an amount of watts necessary to overcome the respective resistance variable to travel at a set speed;

determining a cycling simulation of the ride based on the resistance model; and providing the cycling simulation of the ride to a smart trainer device.

2. The method of claim 1, wherein the ride data includes user-defined data.

3. The method of claim 2, wherein the user-defined data includes rider data, equipment data, environment data, and terrain data.

4. The method of claim 3, wherein the rider data includes a weight of the rider, a size of the rider, and a riding position of the rider.

5. The method of claim 3, wherein the equipment data includes a weight of the bicycle, type of wheel, type of tires, tire pounds per square inch (psi), head tube angle, fork travel, rear axle travel, rear shock travel, suspension spring rate, suspension damping rate, and sag.

6. The method of claim 1, wherein determining the resistance variable for each time segment includes identifying an obstacle and determining a watts difficulty rating for the obstacle.

7. The method of claim 6, wherein each of the power variables includes an amount of watts necessary to overcome the watts difficulty rating for the obstacle included in the respective resistance variable.

8. A system comprising:

a bicycle comprising a suspension;

a plurality of sensors comprising a suspension sensor configured to measure a physical impact on the suspension;

a smart trainer device; and an electronic processor configured to:

receive ride data collected by the plurality of sensors during a ride on a trail, wherein the ride data is segmented into a plurality of time segments, and wherein the plurality of sensors are mounted to the bicycle or a rider of the bicycle;

determine a resistance model for the rider and the trail by:

determining a resistance variable for each of the plurality of time segments based on the received ride data, and determining, for each of the plurality of time segments, a power variable necessary to overcome the respective resistance variable based on a plurality of user-specific variables;

determine a cycling simulation of the ride based on the resistance model; and provide the cycling simulation of the ride to the smart trainer device.

9. The system of claim 8, wherein a movement of the suspension is measured in millimeters.

10. A method comprising:

receiving ride data collected by a plurality of sensors during a ride on a trail, wherein the ride data is segmented into a plurality of time segments, and wherein the plurality of sensors are mounted to a bicycle or a rider of the bicycle and include a first camera and a second camera configured to record image data;

determining a resistance model for the rider and the trail by:

determining a resistance variable for each of the plurality of time segments based on the received ride data, and determining, for each of the plurality of time segments, a power variable necessary to overcome the respective resistance variable based on a plurality of user-specific variables;

determining a cycling simulation of the ride based on the resistance model; and providing the cycling simulation of the ride to a smart trainer device.

11. The method of claim 10, wherein the first camera comprises a wide angled lens and is positioned under a chin of the rider.

12. The method of claim 10, wherein the second camera comprises a three-hundred-and-sixty degrees camera that is positioned above a helmet worn by the rider and attached to a rigging system that centers the camera on the rider while being independent of a head and a neck of the rider.

13. The method of claim 10, wherein the plurality of sensors include a geolocation device configured to record position data, wherein the ride data includes the image data and the position data recorded during the ride, and wherein determining the resistance variable for each time segment includes determining obstacles by pairing the image data and the position data.

14. The method of claim 1, wherein the plurality of time segments are determined based on timestamps associated with the ride data as metadata.

15. The method of claim 1, wherein the cycling simulation of the ride is determined by processing the resistance model through an artificial intelligence model trained with previously received ride data collected during a plurality of rides on a plurality of trails.

16. The method of claim 15, further comprising retraining the artificial intelligence model with the resistance model.

17. A non-transitory computer-readable medium including instructions executable by an electronic processor to perform a set of functions, the set of functions comprising:

receiving ride data collected by a plurality of sensors during a ride on a trail, wherein the ride data is segmented into a plurality of time segments determined based on timestamps associated with the ride data as metadata, and wherein the plurality of sensors are mounted to a bicycle or a rider of the bicycle;

determining a resistance model for the rider and the trail by:

determining a resistance variable for each of the plurality of time segments based on the received ride data, and determining, for each of the plurality of time segments, a power variable necessary to overcome the respective resistance variable based on a plurality of user-specific variables;

determining a cycling simulation of the ride based on the resistance model; and providing the cycling simulation of the ride to a smart trainer device.

18. A system for determining a cycling simulation of a ride, the system comprising:

a bicycle;

a plurality of sensors;

a smart trainer device; and an electronic processor configured to:

receive ride data collected by the plurality of sensors during a ride on a trail, wherein the ride data is segmented into a plurality of time segments, and wherein the plurality of sensors are mounted to the bicycle or a rider of the bicycle;

determine a resistance model for the rider and the trail by:

determining a resistance variable for each of the plurality of time segments based on the received ride data, and determining, for each of the plurality of time segments, a power variable necessary to overcome the respective resistance variable based on a plurality of user-specific variables;

determine a cycling simulation of the ride based on the resistance model, wherein the cycling simulation of the ride is determined by processing the resistance model through an artificial intelligence model trained with previously received ride data collected during a plurality of rides on a plurality of trails; and provide the cycling simulation of the ride to the smart trainer device.

19. The computer-readable medium of claim 17, wherein each of the power variables includes an amount of watts necessary to overcome the respective resistance variable to travel at a set speed.

20. The system of claim 18, wherein the plurality of time segments are determined based on timestamps associated with the ride data as metadata.

* * * * *